(12) United States Patent
Im

(10) Patent No.: US 9,454,724 B1
(45) Date of Patent: Sep. 27, 2016

(54) MEMBRANE FOR REMOVABLE ELECTRONIC IDENTIFIERS

(71) Applicant: Bong J. Im, Orinda, CA (US)

(72) Inventor: Bong J. Im, Orinda, CA (US)

(73) Assignee: Bong J. Im, Orinda, CA (US)

( * ) Notice: Subject to any disclaimer, the term of this patent is extended or adjusted under 35 U.S.C. 154(b) by 0 days.

(21) Appl. No.: 14/936,003

(22) Filed: Nov. 9, 2015

(51) Int. Cl.
| | |
|---|---|
| *G06K 7/10* | (2006.01) |
| *G06K 19/077* | (2006.01) |
| *B32B 7/06* | (2006.01) |
| *B32B 7/12* | (2006.01) |
| *G09F 3/00* | (2006.01) |
| *G09F 3/02* | (2006.01) |

(52) U.S. Cl.
CPC ............ *G06K 19/0776* (2013.01); *B32B 7/06* (2013.01); *B32B 7/12* (2013.01); *G06K 19/07722* (2013.01); *G06K 19/07783* (2013.01); *G09F 3/02* (2013.01); *G09F 3/0297* (2013.01); *B32B 2519/00* (2013.01); *B32B 2519/02* (2013.01); *G09F 2003/0214* (2013.01); *G09F 2003/0257* (2013.01)

(58) Field of Classification Search
USPC .................. 235/487; 340/572.8; 343/895
See application file for complete search history.

(56) References Cited

U.S. PATENT DOCUMENTS

| | | | |
|---|---|---|---|
| 6,265,977 B1 * | 7/2001 | Vega ................... | G06K 19/0723 257/679 |
| 2005/0001785 A1 * | 1/2005 | Ferguson ......... | G06K 19/07745 343/895 |
| 2005/0035924 A1 * | 2/2005 | Liu ................... | G06K 19/07749 343/895 |
| 2007/0210924 A1 * | 9/2007 | Arnold ................... | B31D 1/021 340/572.8 |
| 2007/0231571 A1 * | 10/2007 | Lane ................... | B29C 47/0021 428/354 |
| 2009/0227299 A1 * | 9/2009 | Seeley .............. | H04M 1/72527 455/575.1 |

\* cited by examiner

*Primary Examiner* — Allyson Trail

(57) ABSTRACT

A membrane is formed from a release liner upon which a plurality of labels and a margin sheet are attached. Each label is a flexible planar body, including a display surface on a top side and an electronic circuit on a bottom side. A first adhesive coating is applied to the bottom of the flexible planar body, allowing the label to be temporarily adhered to the release liner. An antenna is joined to the electronic circuit and connected to the flexible planar body. The electronic circuit itself enables item identification, such as through Radio-Frequency Identification or Electronic Article Surveillance. In order to provide visual information, a primary printed graphic can be applied to each of the labels, while a supplementary printed graphic can be applied to the margin sheet. The plurality of labels can be arranged in different arrays, such as a plurality of rows or a tessellated pattern.

19 Claims, 9 Drawing Sheets

MEMBRANE FOR REMOVABLE ELECTRONIC IDENTIFIERS

FIELD OF THE INVENTION

The present invention relates generally to a planar array of electronic labels which attached to a release liner through an adhesive coating.

BACKGROUND OF THE INVENTION

Electronic identifiers have become an integral part of business, both retail and otherwise. Through the use of technologies such as Radio-Frequency Identification (RFID), businesses have been provided with the ability to easily detect and identify products. As it is desirable to attach such labels to a variety of products and items, electronic identifiers are commonly incorporated into adhesive labels and sold in rolls. While the use of such roll-based labels is wide spread, there are many drawbacks. Rolls are not compatible with conventional printers, meaning that any relevant information (e.g. barcodes, product descriptions, and other markings) must be applied using a specialty printer.

It is therefore an object of the present invention to provide a flat sheet which is compatible with conventional printers, which reduces required packaging volume, and overall improve ease of handling.

DETAIL DESCRIPTIONS OF THE INVENTION

Figure 1:
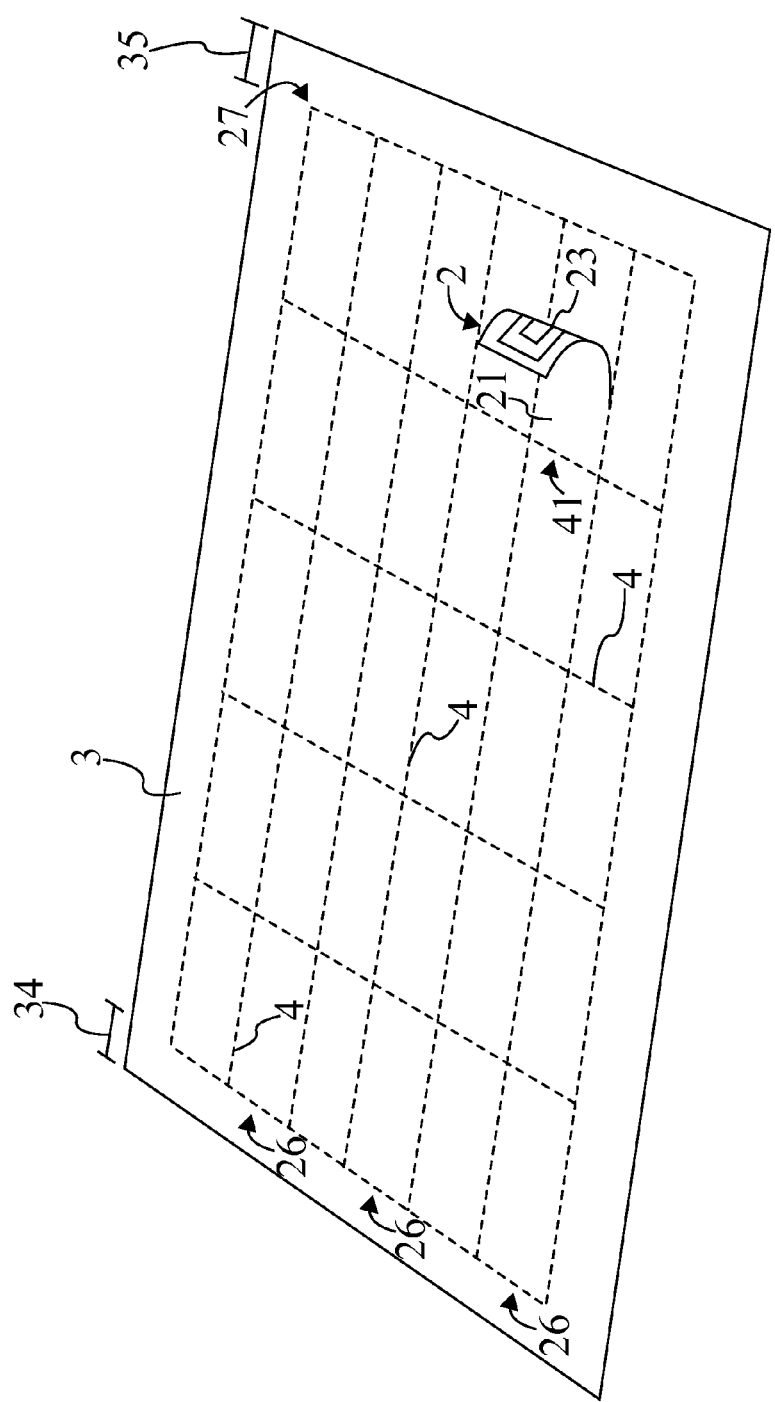
FIG. 1 is a perspective view of the present invention.
Figure 2:
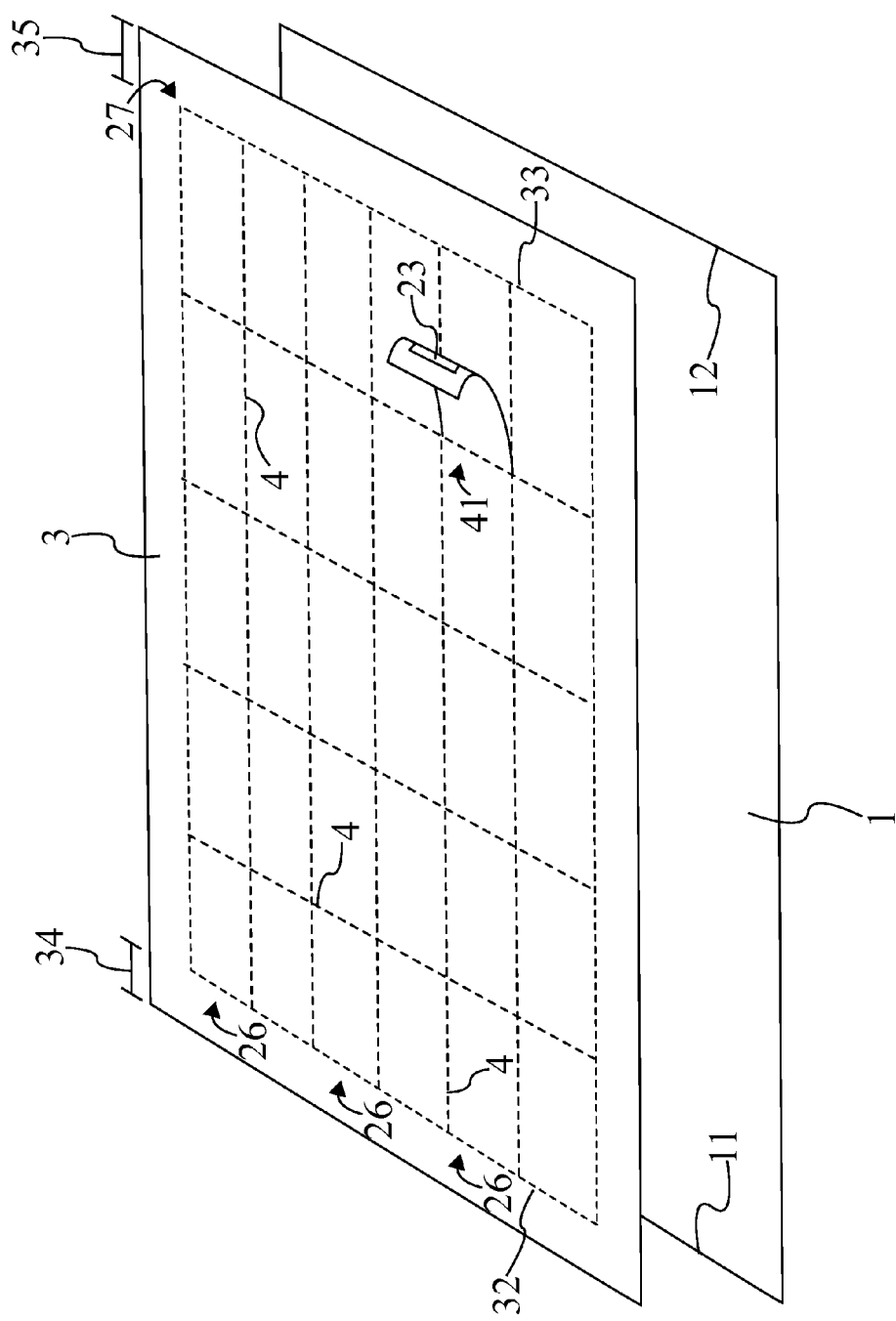
FIG. 2 is an exploded perspective view of the present invention.
Figure 3:
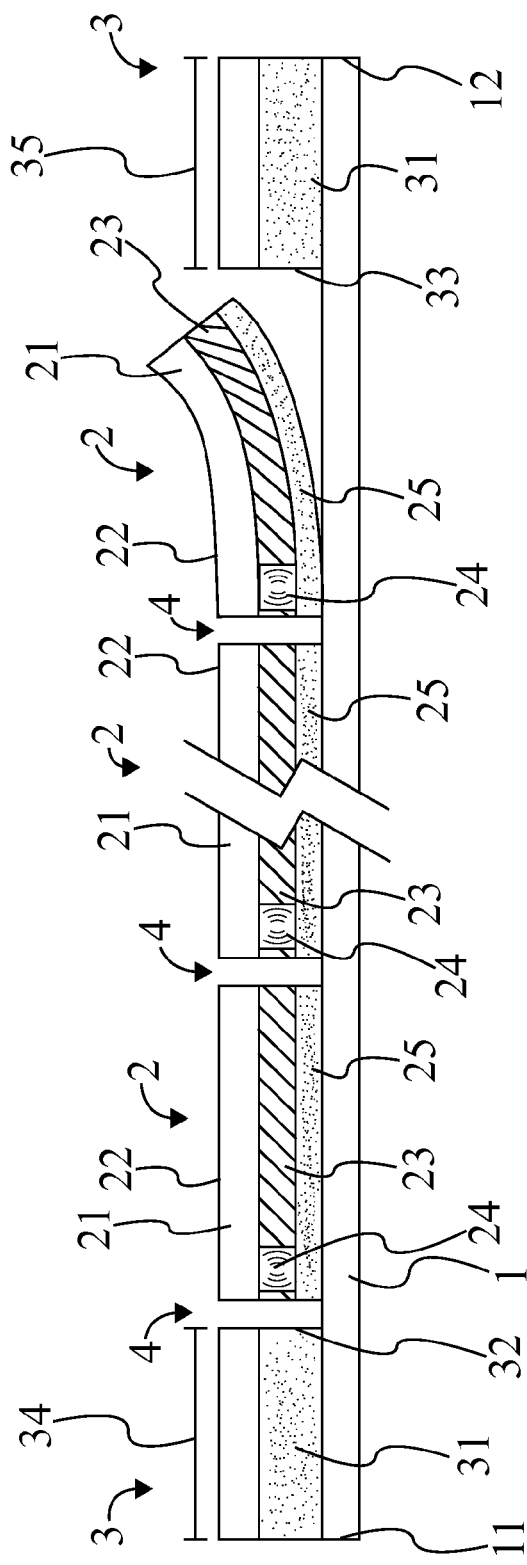
FIG. 3 is a front elevational cross-sectional view of the present invention.
Figure 4:
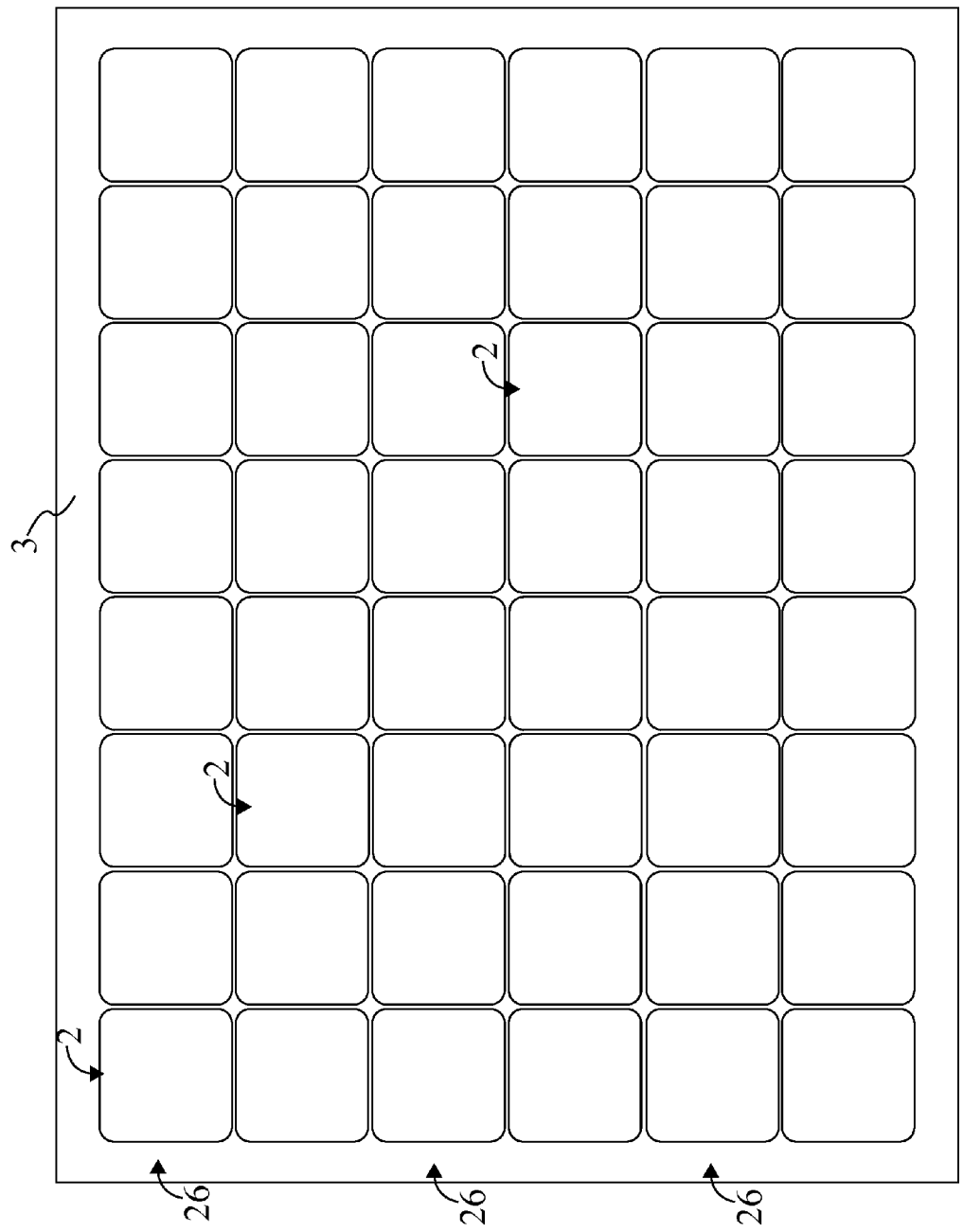
FIG. 4 is a top plan view showing a square variation of shapes for a plurality of labels of the present invention.
Figure 5:
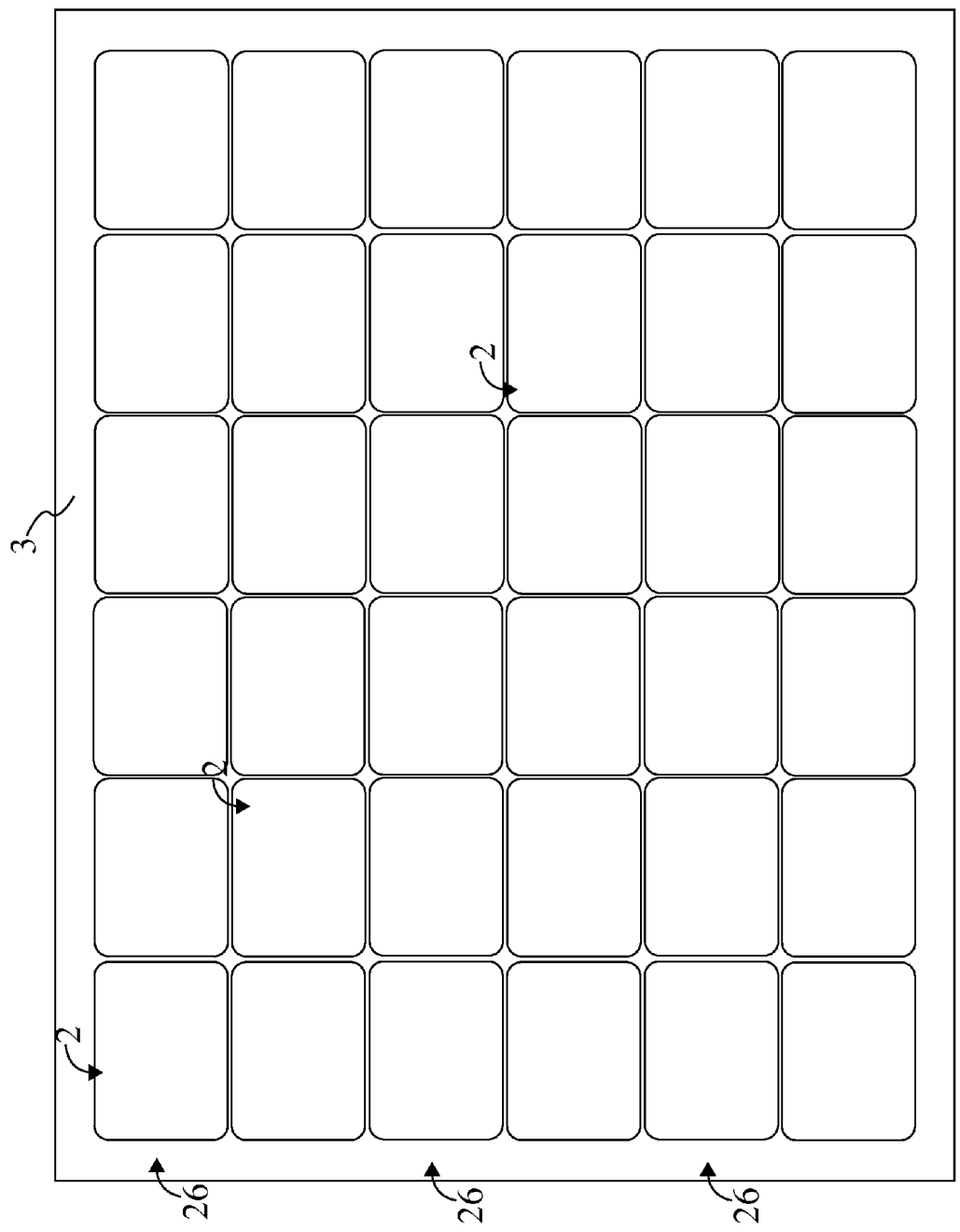
FIG. 5 is a top plan view showing a rectangular variation of shapes for the plurality of labels.
Figure 6:
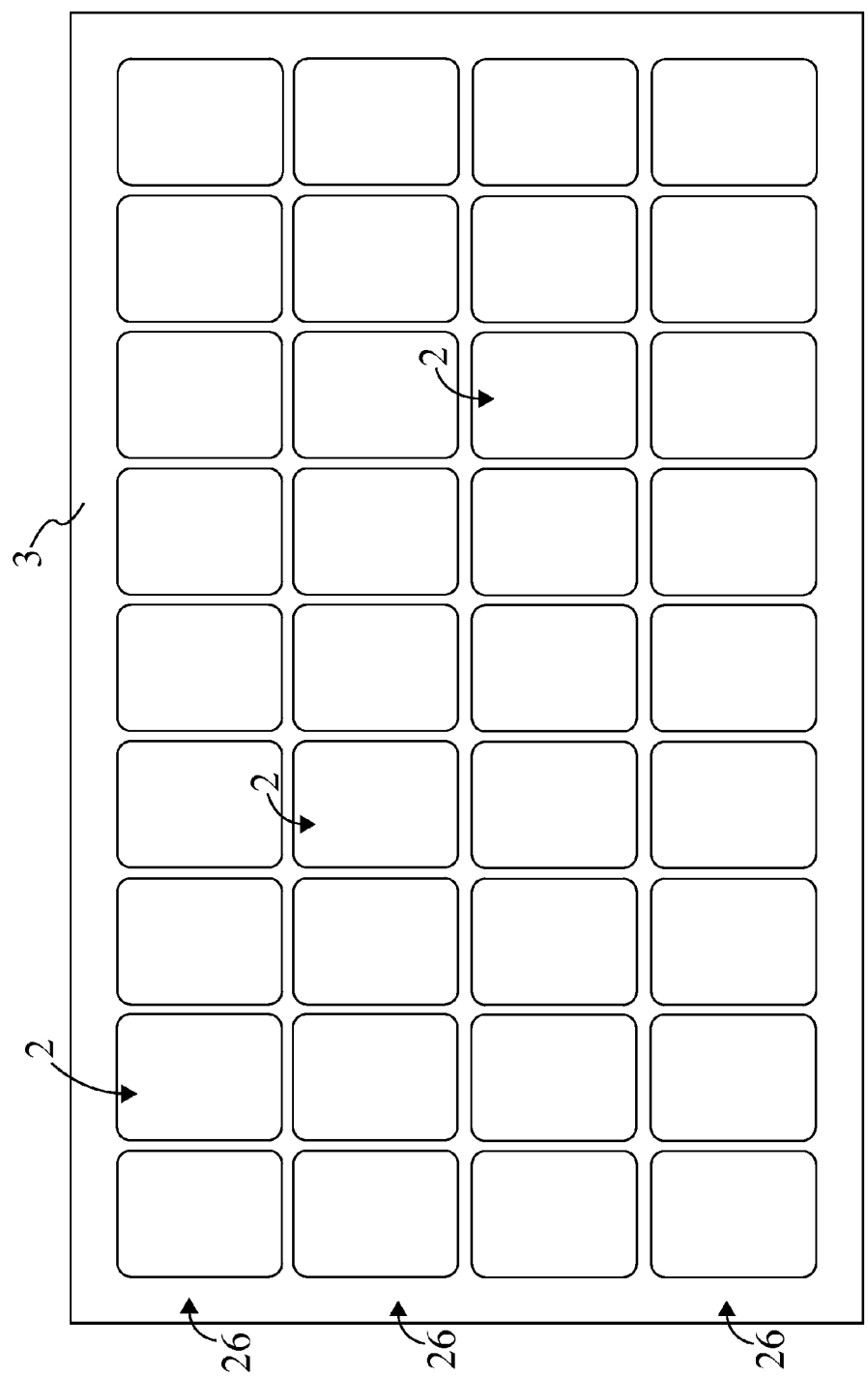
FIG. 6 is a top plan view showing another rectangular variation of shapes for the plurality of labels.
Figure 7:
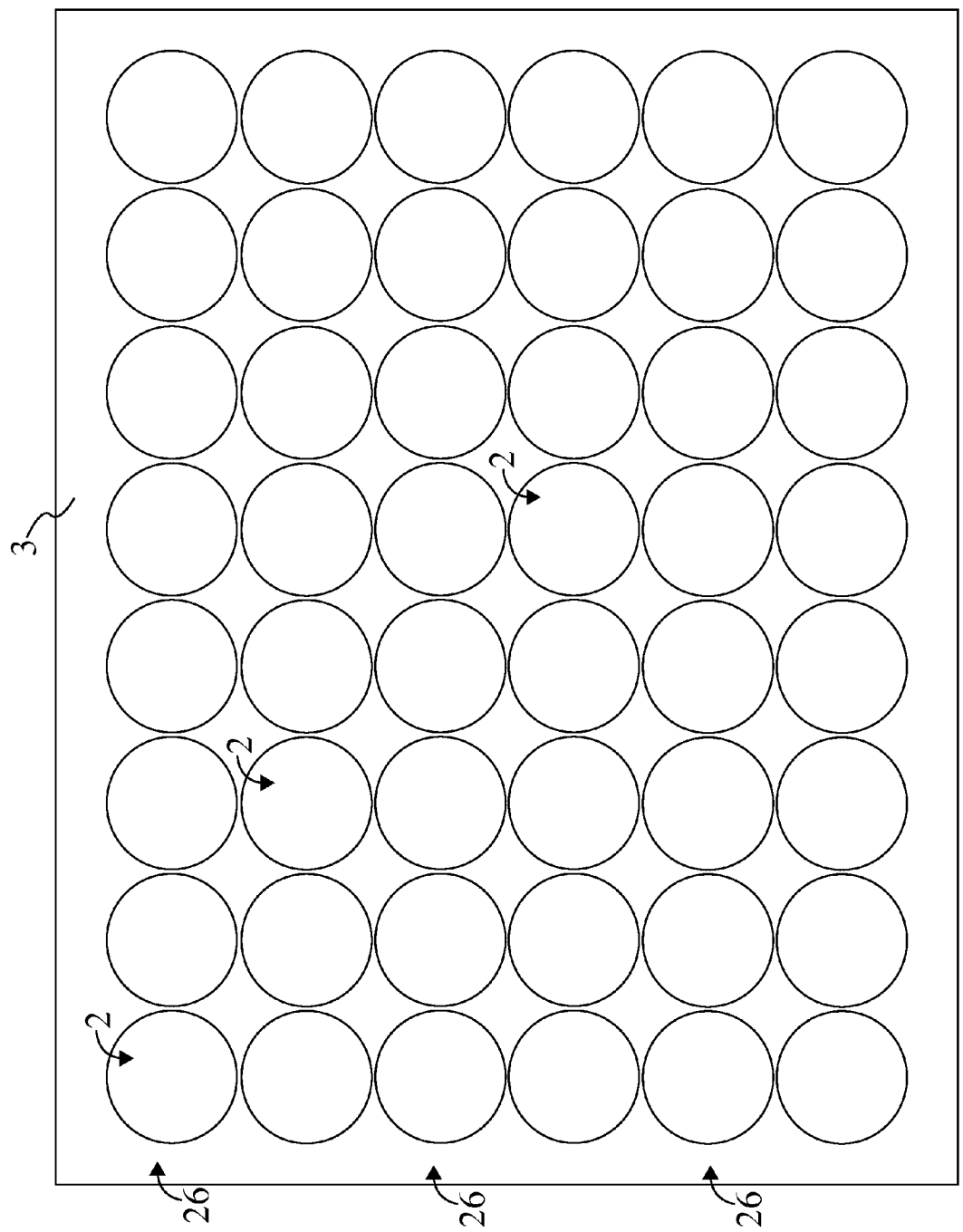
FIG. 7 is a top plan view showing a circle variation of shapes for the plurality of labels.

All illustrations of the drawings are for the purpose of describing selected versions of the present invention and are not intended to limit the scope of the present invention.

The present invention is a membrane for removable electronic identifiers, one that is embodied as a printer friendly sheet. The components and configuration of the present invention are an improvement over traditional roll-based labels 2, which often require specialty printers and are susceptible to tangling, catching, and other jamming factors during printing. The present invention is depicted via FIG. 1-FIG. 9.

The present invention comprises a release liner 1, a plurality of labels 2, and a margin sheet 3. Each of plurality of labels 2 are removable from the release liner 1 such that they may be attached to a product. The individual labels 2 each comprise a flexible planar body 21, a display surface 22, an electronic circuit 23, an antenna 24, and a first adhesive coating 25. The flexible planar body 21 aids with removal of each label 2 from the release liner 1, as well as application of each label 2 to a product. The display surface 22 acts as a top of the flexible planar body 21, such that the display surface 22 remains visible even when the plurality of labels 2 is attached to the release liner 1.

The electronic circuit 23 enables electronic identification through the present invention, as described in more detail later.

The antenna 24 is electronically connected to the electronic circuit 23, such that the electronic circuit 23 can communicate with external devices through the antenna 24. Both the antenna 24 and the electronic circuit 23 are mounted to an underside of the flexible planar body 21; the electronic circuit 23 is mounted between the first adhesive coating 25 and the flexible planar body 21, while the antenna 24 is adjacently connected to the flexible planar body 21. The electronic circuit 23 is further defined as being positioned opposite the display surface 22 through the flexible planar body 21. Likewise, the antenna 24 is positioned opposite the display surface 22 through the flexible planar body 21.

The first adhesive coating 25 serves to bonds the plurality of labels 2 to the release liner 1; the first adhesive coating 25 can be disengaged from the release liner 1 without suffering a deterioration in adhesive quality. Thus, one or more of the plurality of labels 2 can individually be removed from the release liner 1 and securely attached to a product.

Paralleling the first adhesive coating 25, a second adhesive coating 31 of the margin sheet 3 serves to bond the margin sheet 3 to the release liner 1. The release liner 1 allows the margin sheet 3 to be removed (whether completely or in sections) by disengaging the second adhesive coating 31; the second adhesive coating 31 can then be used to secure the margin sheet 3 to another surface.

The flexible body itself comprises a display surface 22, onto which the primary printed graphics 5 is positioned. The primary printed graphic 5 provides information relevant to products to which the labels 2 are affixed. Examples of possible implementations for the primary printed graphic 5 are later discussed in more detail.

The margin sheet 3 acts as a region that can be printed upon as later discussed. The margin sheet 3 is thus positioned around the plurality of labels 2, along the perimeter of the release liner 1. The margin sheet 3 itself is adjacently attached to the release liner 1, as is the plurality of labels 2. Resultantly, the margin sheet 3 can be detached from the release liner 1 if so desired.

The margin sheet 3 serves to outline the plurality of labels 2, with the margin sheet 3 being positioned around the plurality of labels 2. Stated otherwise, the plurality of labels 2 is enclosed by the margin sheet 3. The margin sheet 3, being a border, is perimetrically aligned with the release liner 1; the perimeter of the margin sheet 3 is coincident with the perimeter of the release liner 1. The margin sheet 3, being separate from the plurality of labels 2, allows for secondary and tertiary information (e.g. relating to the electronics rather than the products for which the labels 2 are being produced) to be displayed.

To delineate the margin sheet 3 from the plurality of labels 2, as well as to facilitate individual removal of each of the plurality of labels 2, a plurality of serial perforations 4 is incorporated into the present invention. The plurality of serial perforations 4 traverses through the display surface 22, flexible planar body 21, and first adhesive coating 25.

Effectively, the plurality of serial perforations 4 serves as a preformed cut that allows each of the plurality of labels 2 to easily be individually removed. The plurality of perforations 4 cuts through the display surface 22 and through the flexible planar body 21 of the plurality of labels 2. Thus, the plurality of perforations is applied to a single sheet (applied above the release liner 1) in order to define the plurality of labels 2 and the margin sheet 3.

To help separate individual labels 2 from the plurality of labels 2, a closed loop of serial perforations delineates each of the plurality of labels 2. This results in each individual label 2 being outlined by a corresponding closed loop of serial perforations. Said closed loops of perforations allow a person to easily grasp a desired label 2 and peel it away from the release liner 1. Overall, the plurality of serial perforations 4 improve user friendliness of the present invention.

The first adhesive coating 25 and the second adhesive coating 31 are created from the same single application of adhesive. Prior to perforation, the electronics of the present invention, i.e. the electronic circuit 23 and antenna 25 for each of the plurality of labels 2 is integrated into said sheet. This can be accomplished through a variety of processes, some examples including chemical etching, printing, and stamping. The adhesive is then applied to the sheet which is itself is pressed against the release liner 1. Thanks to its fluid nature, the adhesive spreads across the sheet, automatically compensating for varying thickness that results from the electronic circuit 23 and antenna 25. The plurality of perforations 4 are then applied, resulting in the distinct plurality of labels 2, margin sheet 3, and respective first adhesive coating 25 and second adhesive coating 31 of the ready-to-use form of the present invention.

In different embodiments of the present invention, the electronic circuit 23 can be implemented in different forms. In one example embodiment, the electronic circuit 23 is a Radio-Frequency Identification chip 231 (RFID chip). In another embodiment, the electronic circuit 23 is an Electronic Article Surveillance chip 232 (EAS chip). Both of these electronic circuits 23 act as tags that can store and process information relating to an item to which they are attached. The electronic circuits 23, being joined to the flexible planar body 21, can easily be attached to a desired product by removing the flexible planar body 21 from the release liner 1 and subsequently pressing the flexible planar body 21 upon the product in order to engage the adhesive coating with the surface of the product. The electronics of the present invention can be seen in FIG. 1-FIG. 3.

Figure 8:
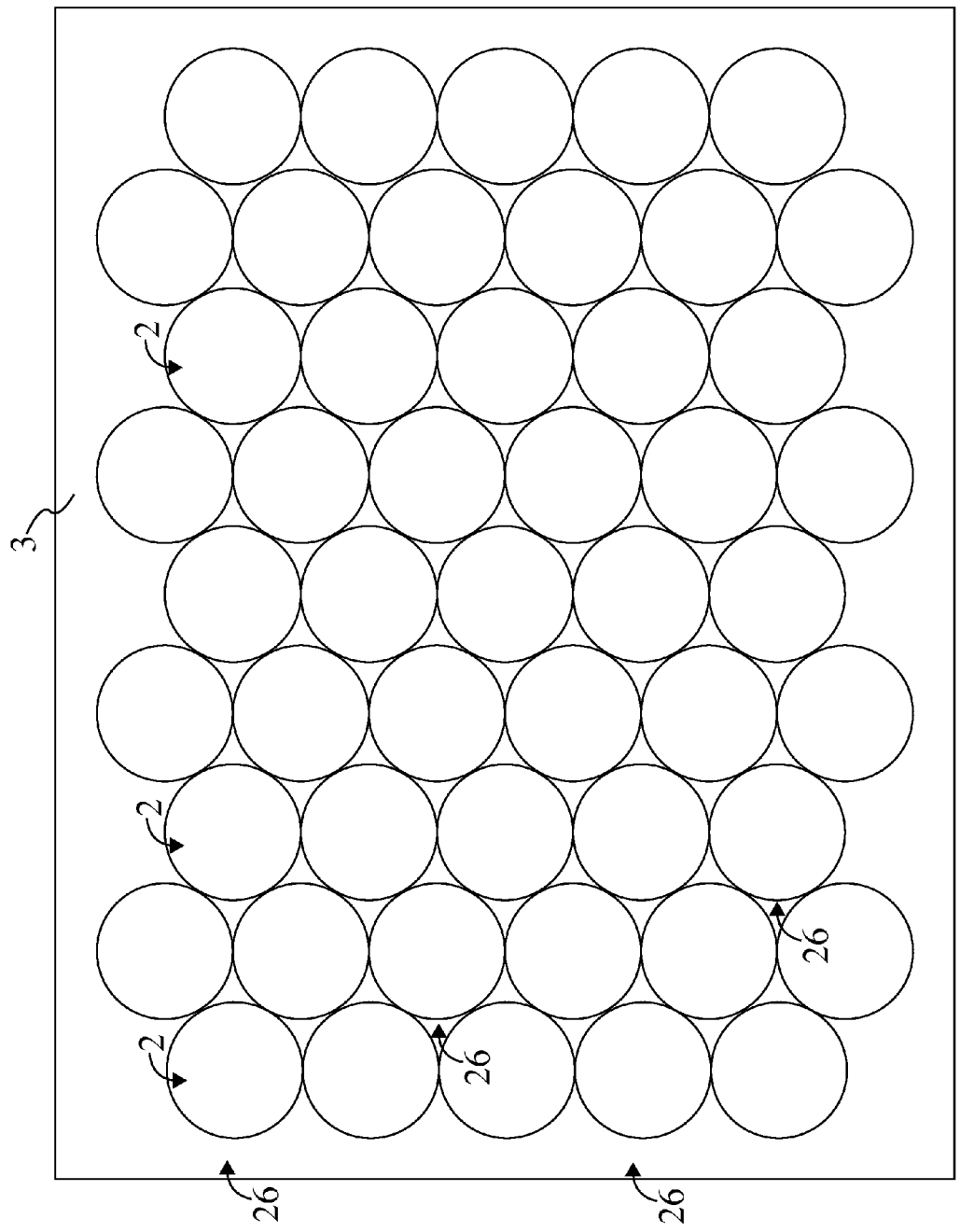
FIG. 8 is a top plan view showing a circle variation of shapes in a staggered array for the plurality of labels.

The plurality of labels 2 can be implemented in a variety of shapes and patterns, as shown in FIG. 4-FIG. 8. In one embodiment, the plurality of labels 2 is arranged into a plurality of rows 26. The plurality of rows 26 can even be staggered, as shown in FIG. 8. Potentially, the plurality of labels 2 can also be arranged into a tessellated pattern 27, where the borders of each label 2 are coincident. This results in more usable space on the release liner 1.

As the plurality of labels 2 are intended to be affixed to products, in one embodiment is advantageous to provide a primary printed graphic 5 as part of the present invention. The primary printed graphic 5 is positioned onto the display surface 22 of each of the plurality of labels 2, where it can be easily be viewed. Preferably, the primary printed graphic 5 will provide some sort of information relevant to the product upon which the label 2 is being attached. A number of implementations are possible for the primary printed graphic 5.

In one embodiment, the primary graphic displays a logo 51. The logo 51, for example, can be of a product, of the product's manufacturer, or even of a specific retailer.

Another example for information displayed via the primary printed graphic 5 is a barcode 52, i.e. an identifying mark which can be optically read by an appropriately equipped computer such as a barcode 52 scanner.

In another embodiment, the primary printed graphic 5 is a written product description 53. This written product description 53 allows for the product to quickly be identified through visual inspection, whether read by a human or analyzed through automated optical character recognition.

A further possible example for the primary printed graphic 5 is the product price 54, specific to the product upon which the label 2 is attached.

The primary printed graphic 5 can include one or more of the above examples in any combination, for example displaying both a logo 51 and barcode 52 or a logo 51 and a product price 54.

In order to provide further relevant information, one embodiment of the present invention comprises a supplementary printed graphic 6. The supplementary printed graphic 6, rather than being positioned onto the display surface 22 of a label 2, is instead positioned onto the margin sheet 3. The supplementary printed graphic 6 can thus display information relevant to the labels 2 (along with their constituent devices), rather than the product upon which the labels 2 are being attached. As with the primary printed graphic 5, a number of implementations are possible for the supplementary printed graphic 6.

One potential example for the supplementary printed graphic 6 is a manufacturer identification 61, e.g. a name or number that corresponds to the manufacturer.

Another potential example is a lot number of the electronic circuit 62, which helps to quickly identify when and where the electronic circuit 23 was produced in the event of a failure or ultimately any reason that may require checking time and place of manufacture.

Also possible is a production date 63, which specifies when the electronic circuit 23 was produced. Similarly, an expiration date 64 (based on the date of production) can be displayed through the supplementary printed graphic 6.

Other possibilities include a model number specific to the electronic circuit 23, as well as an instruction for use 66. The supplementary printed graphic 6, as with the primary printed graphic 5, is not limited to any single example; any combination of provided examples can be implemented as part of the supplementary printed graphic 6.

In order to make the present invention more printer-friendly, in a preferred embodiment the margin sheet 3 has equal margins on either side. That is, provided a first perimeter edge 11 and opposite perimeter edge 12 of the margin sheet 3, along with a corresponding first interior edge 32 and opposite interior edge 33 of the release liner 1, the space between each pair of corresponding edges is equal.

A first indent distance 34 is defined as separating the first interior edge 32 of the margin sheet 3 from the first perimeter edge 11 of the release liner 1. Likewise, a second indent distance 35 is defined as separating the opposite interior edge 33 of the margin sheet 3 from the opposite perimeter edge 12 of the release liner 1. More specifically, the first indent distance 34 and second indent distance 35 can refer to a left margin and a right margin or a top margin and bottom margin. Equal margins (e.g. left and right or top and bottom) mean the release liner 1 can be fed into a printer in multiple orientations without affecting the print, thanks to the symmetrical margins.

The ability to feed the release liner 1 into a printer in any orientation is helpful for positioning of the primary printed graphic 5 onto the display surface 22 and the supplementary printed graphic 6 onto the margin sheet 3. This increases flexibility of the present invention, as printed graphics do not need to be applied to the margin sheet 3 and plurality of labels 2 until ready for use. Prior to being fed through a printer, the margin sheet 3 and plurality of labels 2 are each blank; this allows them to be adapted to any specific product with relevant printed graphics on the fly, making them more adaptable to various uses.

Figure 9:
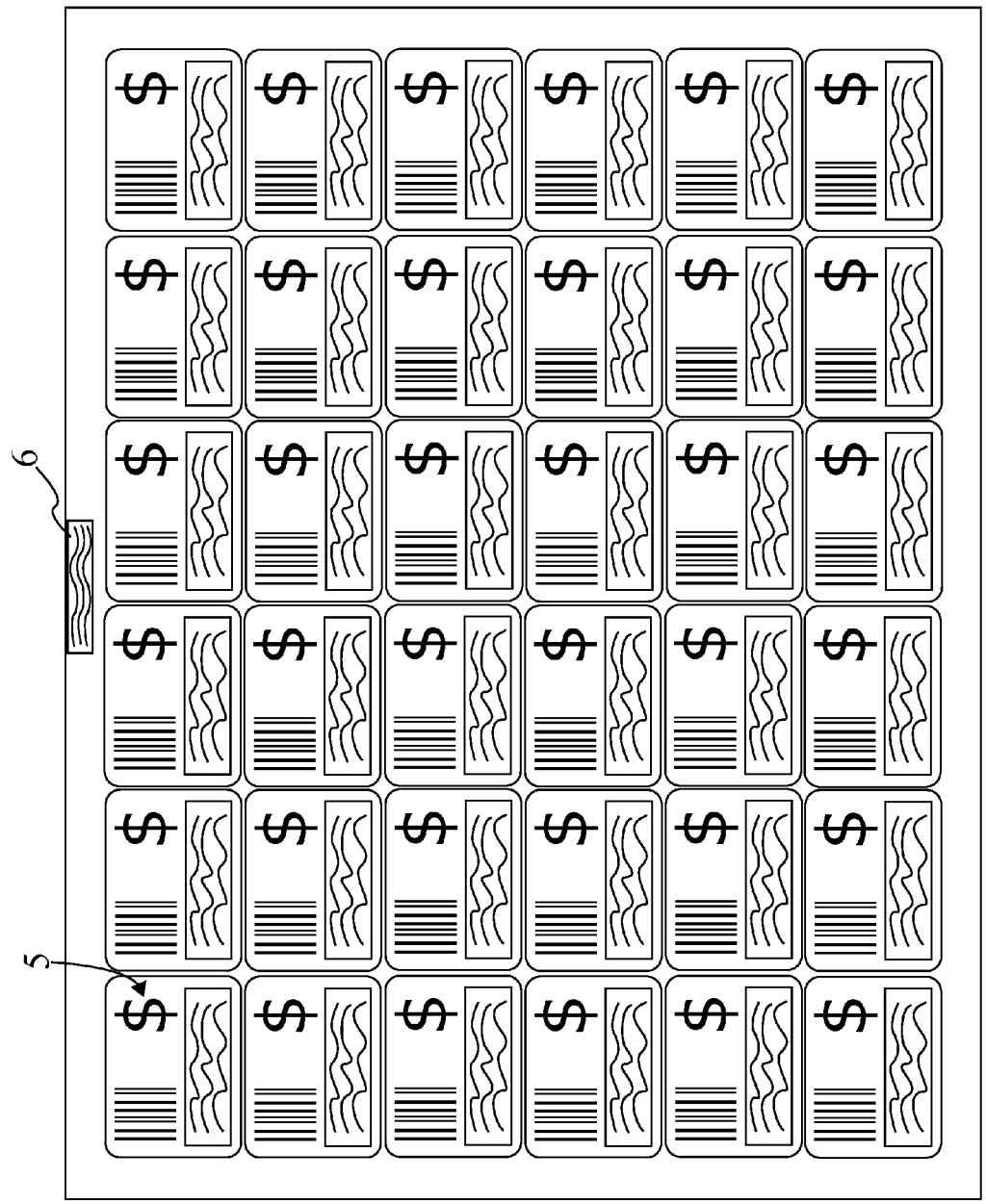
FIG. 9 is a top plan view showing a primary printed graphic and a supplementary printed graphic of the present invention.

The components and configurations of the present invention result in several advantages over traditional roll-based labels. The planar nature of the present invention means it is compatible with conventional printers, whether ink-jet, laser-jet, or xerographic. This is in comparison to roll-based labels, which are often incompatible with such conventional printers. The present invention, on the other hand, can be enhanced with a primary printed graphic 5 (e.g. logos 51, barcodes 52, and written information) as well as a supplementary printed graphic 6 (e.g. manufacturer information and specs relating to the RFID chip or EAS chip). These printed graphics are shown in FIG. 9.

A further benefit of the planar configuration of the present invention, as compared to roll-based labels, is reduced space requirements. The use of a flat sheet rather than a roll reduces volume by more than 65%. This allows for much more compact storage and shipping space.

Another benefit of using sheets rather than rolls is that sheets are more easily distributed between workers; thus more workers can be used to attach labels 2 to products. As a single roll typically contains 1,000-2,000 labels, the use of sheets rather than rolls allows the same amount of labels to more easily be split up between workers and thus more quickly applied to products.

Furthermore, as the sheets of the present invention are easily stacked, they are also easily shrink-wrapped. Shrink-wrapping is beneficial as it maintains effectiveness of the adhesive coating over a longer period of time, compared to sheets that are not shrink-wrapped.

The sheet configuration, unlike a roll-based label, is much less prone to twisting, which slows work progress. This is another advantage of the present invention compared to prior art. Another issue related to roll-based labels is the tendency to unwind when an open end is placed on the ground. Issues such as these are non-existent with the sheet style implemented by the present invention. For these reasons, the present invention is advantageous when compared to existing solutions. Different embodiments of the present invention can be implemented without negating these advantages.

Although the invention has been explained in relation to its preferred embodiment, it is to be understood that many other possible modifications and variations can be made without departing from the spirit and scope of the invention as hereinafter claimed.

What is claimed is:

1. A membrane for removable electronic identifiers comprises:
    a release liner;
    a plurality of labels;
    a margin sheet;
    each of the plurality of labels comprises a flexible planar body, a display surface, an electronic circuit, an antenna, and a first adhesive coating;
    the margin sheet comprises a second adhesive coating;
    the electronic circuit being mounted between the first adhesive coating and the flexible planar body;
    the electronic circuit being positioned opposite the display surface through the flexible planar body;
    the antenna being mounted between the first adhesive coating and the flexible planar body;
    the antenna being positioned opposite the display surface through the flexible planar body;
    the electronic circuit being electronically connected to the antenna;
    each of the plurality of labels being adjacently attached to the release liner by the first adhesive coating;
    the margin sheet being adjacently attached to the release liner by the second adhesive coating;
    the margin sheet being perimetrically aligned with the release liner; and
    the margin sheet being positioned around the plurality of labels.

2. The membrane for removable electronic identifiers as claimed in claim 1 comprises:
    a plurality of serial perforations;
    the plurality of serial perforations traversing through the display surface, the flexible planar body, and the first adhesive coating;
    each of the plurality of labels being delineated by a closed loop set of serial perforations from the plurality of serial perforations.

3. The membrane for removable electronic identifiers as claimed in claim 1 comprises:
    a primary printed graphic; and
    the primary printed graphic being positioned onto the display surface.

4. The membrane for removable electronic identifiers as claimed in claim 2 comprises:
    the primary printed graphic displaying information selected from the group consisting of: a logo, a computer-readable barcode, a written product description, a product price, and combinations thereof.

5. The membrane for removable electronic identifiers as claimed in claim 1 comprises:
    a supplementary printed graphic; and
    the supplementary printed graphic being positioned onto the margin sheet.

6. The membrane for removable electronic identifiers as claimed in claim 4 comprises:
    the supplementary printed graphic displaying information selected from the group consisting of: a manufacturer identification, a lot number of the electronic circuit, a production date, an expiration date, a model number of the electronic circuit, an instruction for use, and combinations thereof.

7. The membrane for removable electronic identifiers as claimed in claim 1 comprises:
    the electronic circuit being a radio-frequency identification chip.

8. The membrane for removable electronic identifiers as claimed in claim 1 comprises:
    the electronic circuit being an electronic article surveillance chip.

9. The membrane for removable electronic identifiers as claimed in claim 1 comprises:
    the release liner comprises a first perimeter edge and an opposite perimeter edge;
    the margin sheet comprises a first interior edge and an opposite interior edge;
    the first interior edge being offset from the first perimeter edge by a first indent distance; and the opposite interior edge being offset from the opposite perimeter edge by a second indent distance.

10. The membrane for removable electronic identifiers as claimed in claim 1 comprises:
the plurality of labels being arranged into a plurality of rows;
the plurality of rows being staggered; and
each of the plurality of rows being coextensive with each other.

11. The membrane for removable electronic identifiers as claimed in claim 1 comprises:
the plurality of labels being arranged into a tessellated pattern.

12. A membrane for removable electronic identifiers comprises:
a release liner;
a plurality of labels;
a margin sheet;
a plurality of serial perforations;
a primary printed graphic;
a supplementary printed graphic;
each of the plurality of labels comprises a flexible planar body, a display surface, an electronic circuit, an antenna, and a first adhesive coating;
the margin sheet comprises a second adhesive coating;
the electronic circuit being mounted between the first adhesive coating and the flexible planar body;
the electronic circuit being positioned opposite the display surface through the flexible planar body;
the antenna being mounted between the first adhesive coating and the flexible planar body;
the antenna being positioned opposite the display surface through the flexible planar body;
the electronic circuit being electronically connected to the antenna;
the plurality of serial perforations traversing through the display surface, the flexible planar body, and the first adhesive coating;
each of the plurality of labels being delineated by a closed loop set of serial perforations from the plurality of serial perforations;
each of the plurality of labels being adjacently attached to the release liner by the first adhesive coating;
the margin sheet being adjacently attached to the release liner by the second adhesive coating;
the margin sheet being perimetrically aligned with the release liner;
the margin sheet being positioned around the plurality of labels;
the primary printed graphic being positioned onto the display surface; and
the supplementary printed graphic being positioned onto the margin sheet.

13. The membrane for removable electronic identifiers as claimed in claim 12 comprises:
the primary printed graphic displaying information selected from the group consisting of: a logo, a computer-readable barcode, a written product description, a product price, and combinations thereof.

14. The membrane for removable electronic identifiers as claimed in claim 12 comprises:
the supplementary printed graphic displaying information selected from the group consisting of: a manufacturer identification, a lot number of the electronic circuit, a production date, an expiration date, a model number of the electronic circuit, an instruction for use, and combinations thereof.

15. The membrane for removable electronic identifiers as claimed in claim 12 comprises:
the electronic circuit being a radio-frequency identification chip.

16. The membrane for removable electronic identifiers as claimed in claim 12 comprises:
the electronic circuit being an electronic article surveillance chip.

17. The membrane for removable electronic identifiers as claimed in claim 12 comprises:
the release liner comprises a first perimeter edge and a opposite perimeter edge;
the margin sheet comprises a first interior edge and an opposite interior edge;
the first interior edge being offset from the first perimeter edge by a first indent distance; and
the opposite interior edge being offset from the opposite perimeter edge by a second indent distance.

18. The membrane for removable electronic identifiers as claimed in claim 12 comprises:
the plurality of labels being arranged into a plurality of rows;
the plurality of rows being staggered; and
each of the plurality of rows being coextensive with each other.

19. The membrane for removable electronic identifiers as claimed in claim 12 comprises:
the plurality of labels being arranged into a tessellated pattern.

* * * * *